July 30, 1968 E. J. PASTERNAK 3,395,396

INFORMATION-DEPENDENT SIGNAL SHIFTING FOR DATA PROCESSING SYSTEMS

Filed Nov. 23, 1965 4 Sheets-Sheet 1

INVENTER
E. J. PASTERNAK
BY
Charles Scott Phelan
ATTORNEY

July 30, 1968 E. J. PASTERNAK 3,395,396

INFORMATION-DEPENDENT SIGNAL SHIFTING FOR DATA PROCESSING SYSTEMS

Filed Nov. 23, 1965 4 Sheets-Sheet 2

July 30, 1968 E. J. PASTERNAK 3,395,396

INFORMATION-DEPENDENT SIGNAL SHIFTING FOR DATA PROCESSING SYSTEMS

Filed Nov. 23, 1965 4 Sheets-Sheet 3

United States Patent Office 3,395,396

Patented July 30, 1968

3,395,396

INFORMATION-DEPENDENT SIGNAL SHIFTING FOR DATA PROCESSING SYSTEMS

Edward J. Pasternak, East Orange, N.J., assignor to Bell Telephone Laboratories, Incorporated, New York, N.Y., a corporation of New York Filed Nov. 23, 1965, Ser. No. 509,307

13 Claims. (Cl. 340—172.5)

ABSTRACT OF THE DISCLOSURE

Coincidence gates at the respective stages of a bit-parallel, combinational logic, shift circuit examine at least a part of a bit group for the presence of a certain type of bit. The transmission of the group through each stage with or without shifting depends upon the absense or presence, respectively, of that bit type in the examined part of the group at that stage. The output signals of all of the stage gates together comprise a binary coded representation of the position address in the bit group of the detected bit and are used in a data processor for altering the type of the bit indicated by the address. The final position of the shifted and detected bit is tested for certain conditions by decision logic.

This invention relates to data processing systems in which bit-parallel signals representing information are shifted in accordance with the character of the information represented thereby.

Data processing systems often have occasion to identify the position of a particular bit of information in a processor word group. For example, in telephone systems it is necessary to scan line circuit conditions and formulate a group of bit signals which are advantageously in either a binary ONE or a binary ZERO signal condition, depending upon the status of a line corresponding to a particular bit in the word group. Each time the group of lines is scanned, a new scanner output word is generated; and it is then compared with a previously generated and stored scanner word to determine whether or not there has been a change in the signal status on any of the scanned lines. It is necessary in these line scanning applications to identify the position of a changed bit in the scanner word in order to identify the line which has been subjected to a change in signal status. Once a line has been so identified, the processing system then provides the service required for such line.

One processing system employing scanning operations of the type described is disclosed and claimed in the copending application of A. H. Doblmaier, R. W. Downing, M. P. Fabisch, J. A. Harr, H. F. May, J. S. Nowak, F. F. Taylor, and W. Ulrich, Ser. No. 334,875, filed Dec. 31, 1963. In such systems the two scanner words are compared, for example, in an EXCLUSIVE OR logic operation so that the output thereof includes signals in the binary ONE condition in bit positions wherein the two words differ. The positions of such binary ONE signals are identified in sequence from the rightmost one thereof by a logic array, and the service is provided to the corresponding line and the bit position address stored. Thereafter, to convert a detected ONE to a ZERO a logical code conversion by a logic array responds to the bit position address to supply a converting signal to such address in a dedicated register containing the EXCLUSIVE OR output word. This dedication of register capacity limits the flexibility of the circuits because the output word must always be brought to the same register before the detection or zeroing can be performed in a later time phase.

It is, therefore, one object of the present invention to increase the flexibility of data processing operations.

It is a further object to reduce the time required for processing data for which it is necessary to identify the position of a particular type of bit of a data word.

It is an other object to control a signal shifting circuit in accordance with the information content of signals transmitted therethrough.

These and other objects of the invention are realized in a circuit for moving the bit positions of bit signals in a bit-parallel group of such signals. Combined with such bit moving circuit are circuits that are responsive to the information character of signals in the bit group for controlling the extent of movement of the bits in the group. The combination of bit-moving and character-responsive circuits is included in a data processing system, and in one embodiment the conmbination is so utilized that the output signals of the character-responsive circuits indicate the bit position address of an information bit of predetermined signal type. Such bit position address signals are utilized for controlling a part of the processing system operation. One such operation part is an operation for altering the signal type of the signal in the indicated bit position.

It is one feature of the invention that the bit-moving and character-responsive circuit combination is a combinational logic circuit in which an output signal condition prevails for as long as a predetermined combination of input signals prevails.

It is another feature that a data processor employing multiple general purpose accumulator registers utilizes the bit-moving and character-responsive circuit combination for operating directly on the contents of any selectable one of such registers.

A further feature of the invention is that the processing system is controlled by a program of processor instructions, and it executes transfer instructions in such program while simultaneously providing signals indicating the position address of a bit in a selected processor word, which bit is related to a specified transfer criterion in the transfer instruction.

Yet another feature of the invention is that processor operations utilizing the bit-moving and character-responsive circuit combination also utilize in conjunction therewith the normal processor circuit paths so that all phases of operations with such combination are readily maintainable by processor self-diagnostic functions.

A more complete understanding of the invention and its various features, objects, and advantages may be obtained from the following detailed description when considered in connection with the appended claims and the attached drawing in which:

Figure 1:
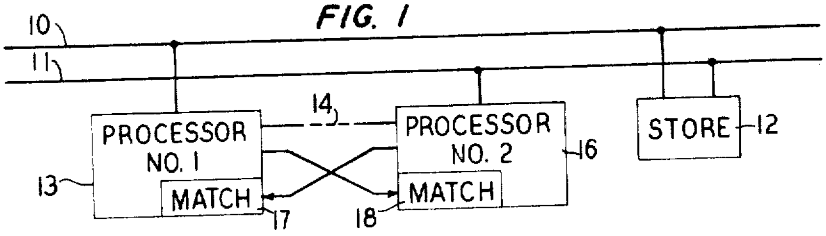
FIG. 1 is a simplified partial block and line diagram of a data processing system in which the invention is advantageously employed.

FIG. 1 is a simplified partial diagram of a data processing system. In that system two buses 10 and 11 provide signal coupling between a store 12 and two processors 13 and 16. The store 12 is any suitable memory system for a data processing arrangement and is adapted to store multi-bit words of binary coded information which represents either data to be utilized in processing operations, or instruction words in a program of instructions for controlling the processors 13 and 16 in the performance of such operations. Bus 11 couples the processor 16 to the store 12. Each of the buses 10 and 11 schematically represents both a read-out bus for coupling output information from the store 12 to the corresponding processor and address bus facilities for coupling address information from the corresponding processor to the store for initiating read-out at a particular addressed location of the store. The buses 10 and 11 also include schematically write-in bus facilities for coupling signals from a processor to the store 12 for controlling the nature of informatin which is to be written at an addressed location. All of these bus facilities are of a type that is well known in the art.

Each of the processors 13 and 16 is advantageously of the type disclosed and claimed in the copending application of A. W. Kettley, W. B. Macurdy, D. Muir III and U. K. Stagg, Jr., Ser. No. 422,313, filed Dec. 30, 1964. The two processors operate normally in parallel, as indicated by a synchronizing coupling 14, to provide reliable operation as well as to permit self-diagnosis in the event of a fault in one of them. It is known in the art to accomplish such self-diagnosis of dual processors by matching signal conditions at certain predetermined circuit locations of the two processors and initiating predetermined maintenance functions in response to the detection of a mismatch in such signal conditions. Matching circuits 17 and 18 are provided in the processors 13 and 16, respectively, for accomplishing the matching operations therefor.

Each of the matching circuits 17 and 18 receives the predetermined signal conditions in its own processor and the corresponding signal conditions in the other processor in signal storage registers connected for this purpose. Outputs from the registers are coupled to circuits which indicate mismatches between any pair of corresponding bit positions in the two matching registers of a processor. Signals from the mismatch indicating circuits are provided to processor control circuits which control the operation of the processor in a predetermined sequence of steps following detection of the mismatch condition. Details of these matching arrangements and of processor control and sequencing arrangements are not shown in the present application because they are of a type known in the art and knowledge of the details thereof is not essential to the understanding of the present invention. However, in accordance with one aspect of the present invention, processor operation is arranged so that the information-responsive shifting operations of the invention are accomplished in a manner which provides greater utilization of the matching circuits for these step functions than was possible in data processing arrangements of the prior art.

Figure 2:
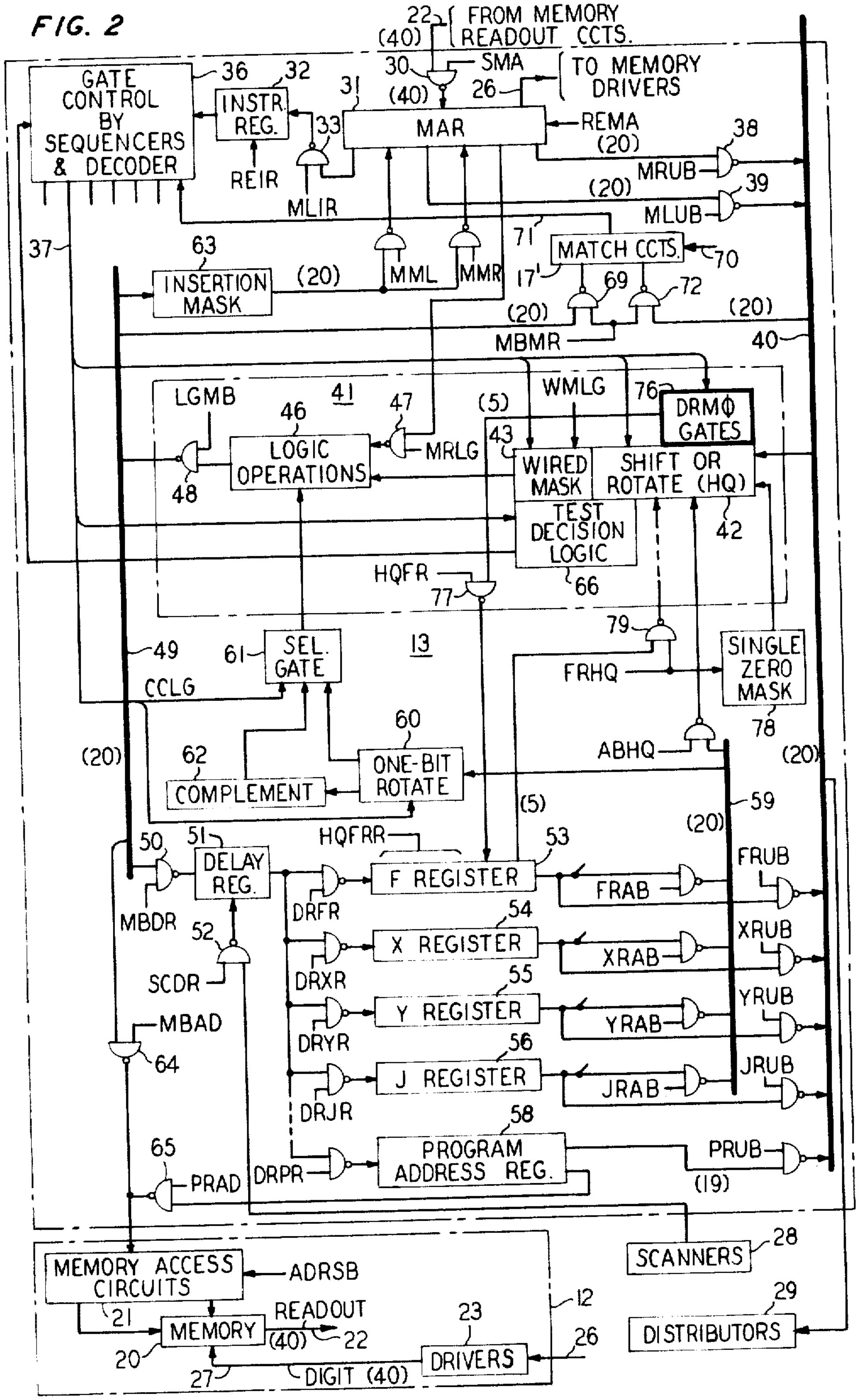
FIG. 2 is a simplified block and line diagram of a data processor utilizing the invention.

The data processor 13 is illustrated in greater detail in FIG. 2 and is similar in many respects to the system disclosed and claimed in the aforementioned Kettley et al. application. Accordingly, its over-all operation will be described here in only enough detail to facilitate an understanding of the operation, features, and advantages of the improvement of the present invention.

Store 12 includes a memory 20 for storing data and program instructions for processor 13. The memory can be any type known in the art. Memory access circuits 21 control the writing in and reading out of information at particular word addresses of the memory 20 as is well known in the art. Read-out from the memory is obtained on sensing circuits 22 which are schematically indicated by a single line representing a plurality of such circuits with one being provided for each bit of a data or program word which is coupled out of the memory 20. In one embodiment, forty such circuits are provided for information to be considered herein as schematically indicated by the number 40 in parentheses adjacent to the cabled circuits 22 in FIG. 2. Driver circuits 23 receive information on circuits 26 from the processor for controlling the bit, or digit, signals on circuits 27 to cause corresponding information to be written into the memory 20. The remaining circuits illustrated in FIG. 2 comprise the processor 13 which receives input data from external sources by way of scanner circuits 28 and which provides data to external circuits by way of distributor circuits 29.

Figure 3:
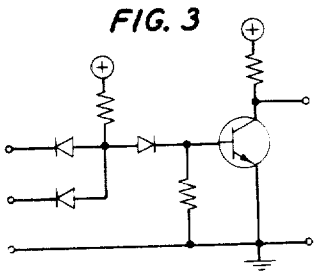
FIGS. 3 and 4 are diagrams of circuit blocks utilized in the construction of the processor of FIG. 2.

In the processor of FIG. 2 a gate 30 receives the read-out signals from the sensing circuits 22 of the memory 20 and applies such signals to a memory access register 31 during a time which is represented by a gating signal SMA that is also applied to an input of the gate 30. The latter gate, and other register input and output gates in the present application, schematically represent a plurality of such gates receiving, respectively, the indicated input leads and separately controlling the same. The signals on circuits 22 may comprise either a 40-bit data word or a 40-bit program instruction word. The gate 30 is a conventional NAND logic gate of the type illustrated in FIG. 3 which has one, two, or more input connections and which is adapted so that the coincidence of high voltage signals at all of its input connections that are not connected to ground as shown in FIG. 3 causes the circuit to produce a low voltage or ground at its single output connection. However, if at least one of those input connections is at a low voltage, e.g., ground, input level, the gate produces at its output a high voltage condition. Such gates usually comprise an input stage of AND logic followed by an output inverting stage such as a common emitter transistor amplifier as illustrated in FIG. 3. Such amplifier may have an individual operating potential source and collector load resistor for developing an output signal, or it may share such source and load resistance with a plurality of other amplifier circuits in different gates or other types of circuits. This type of load-source arrangement is known in the art and is included in the schematic gate representation of the type shown for the gate 30 in FIG. 2. Gates of the type described are basic units of combinational logic from which more complex circuits can be constructed.

Figure 4:
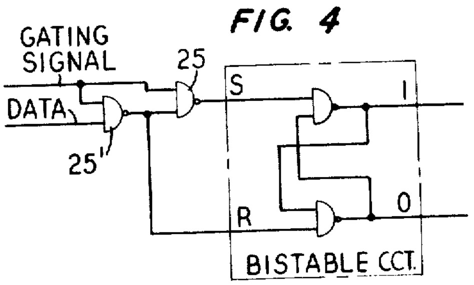

The register 31 is simply an array of bistable circuits which are arranged to receive input signals in parallel and to provide parallel output signals in like manner. Each such bistable circuit may comprise, for example, a pair of cross-coupled NAND gates as is well known in the art and shown in FIG. 4. Single-rail input conections are also shown in FIG. 4 but are not used with the bistable circuits of register 31. Information signals are supplied on a single-rail logic basis to the set inputs of the bistable circuits following a common reset signal REMA which is provided for clearing the register prior to the entry of new information therein. The instruction register 32 is similarly arranged, and the REIR signal provides a common reset to that register.

However, in all of the other registers to be hereinafter mentioned in FIG. 2, each of the bistable circuits thereof advantageously includes single-rail input connections as shown in FIG. 4 and including a gate 25 in the set input lead so that the bistable circuit can be operated on a single-rail logic basis. Thus, each data input signal change causes a change of state in the bistable circuit so that no common reset is required. An additional gate 25' is included in the single-rail input connections to permit the clocking of information into the register under the control of a gating signal. Such gating signal is also applied to gate 25 to permit the bistable circuit to hold an information state registered therein until new information is supplied, all as is well known in the art. The clocking function of gates 25 and 25' in the multiple single-rail connections to a register is schematically represented by a single gate at each register input in the simplified circuit of FIG. 2. No facility is provided for shifting information transversely through the array of bistable circuits in any register.

Gating control signals, such as the aforementioned SMA signal, and register control signals, such as the aforementioned REMA and REIR signals, are produced by control circuits to be hereinafter mentioned. Such signals are designated by mnemonic reference characters which indicate the function of the signal. Thus, the SMA signal causes gating of information from the store 12, i.e., from memory 20, to the memory access register 31; and the REMA signal resets the memory access register.

Binary coded instruction signals are coupled from the left half of the memory access register 31 to the instruction register 32 by a gate 33 in response to the MLIR gating signal. Output from register 32 is applied to a control circuit 36 which includes a clock source, sequencers, and decoders cooperating in a manner well known in the art for developing output signals that are utilized throughout the processor for controlling the various gates and registers in proper sequence for the execution of instructions received from the register 32. The control circuit 36 in FIG. 2 produces the various gate control signals, but actual connections to the gates are not shown because they would unnecessarily complicate the drawing. The aforementioned mnemonic reference characters are utilized instead to represent schematically the coupling between individual gates and the control circuit 36 and to indicate at the same time the type of operation being performed. These mnemonic reference characters are carried over to the timing diagrams of FIG. 7 which will be subsequently discussed. The control circuit 36 also provides output signals on different leads in a cable 37 for controlling various operation circuits of the processor in response to decoded program instructions.

The processor of FIG. 2 is advantageously adapted to process in bit-parallel fashion 20-bit word portions of the 40-bit words which appear from time to time in the memory access register 31. Accordingly, two gates 38 and 39 are provided for coupling the output from either the right half or the left half, respectively, of register 31 to an unmasked bus 40. The bus 40 couples the twenty parallel signals to the input of a tandem logic operations circuit 41. Within the circuit 41 a combinational shift or rotate circuit 42, which receives the signals from the bus 40, is of the combinational logic type shown in the copending application of D. Muir III, filed Dec. 23, 1964, Ser. No. 420,566, and entitled "Shift and Rotate Circuit for a Data Processor." "Combinational logic" refers to circuits receiving plural inputs and producing an output which persists as long as a predetermined relationship among the various inputs is maintained.

Circuit 42 is alternatively designated HQ in the drawings to indicate its capabilities. "H" refers to shifting, and "Q" refers to rotating.

The shift or rotate circuit 42 has the capability of selectably shifting or rotating data signals either left or right, through a selectable number of bit positions. However, for convenience herein, the circuit 42 will be called generically a shift circuit, and its specific function at a given time will be identified. Shifting functions refer to operations wherein bits shifted out of one end of a word are lost, and ZEROS are inserted in vacated positions in the other end of the word. Rotating functions refer to operations wherein bits shifted out of one end of a word are reinserted in the vacated positions in the other end of the word by an end-around carry.

A wired mask circuit 43 cooperates with the shift circuit 42 and couples signals onto a logic operations circuit 46. The logic operations circuit 46 performs operations such as subtract, AND, OR, and EXCLUSIVE OR on a combinational logic basis in response to function selection signals from control circuit 36. Circuit 46 receives a first argument, in the form of signals coupled directly from the memory access register 31, by means of a gate 47 that is controlled by the signal MRLG. An additional control signal WMLG is provided for the wired mask 43 and is the complement of the MRLG signal so that the logic operations circuit 46 may receive its first argument signal by way of either gate 47 or mask 43 but not both of them. A gate 48 responds to the signal LGMB for coupling the output of circuit 46 to a masked bus 49. Signals on the masked bus 49 may be coupled in a variety of paths for different purposes. Thus, a gate 50 responds to a signal MBDR for coupling the masked bus 49 to the input of a delay register 51.

Register 51 can alternatively receive input signals, also on a single-rail logic basis, from scanners 28 by way of a gate 52 which is responsive to the control signal SCDR. Output from the delay register 51 is advantageously selectively coupled to any one of a plurality of general purpose registers 53, 54, 55, or 56. Such registers are not dedicated and may be used for accumulators, index registers, or any other processor function at the programmer's election on any instruction requiring temporary storage. More general purpose registers are advantageously provided, but only the four illustrated are necessary for an understanding of the present invention. These registers are designated the F, X, Y, and J registers, respectively; and they are selected by coupling through gates controlled by the signals DR$\phi$R wherein the "$\phi$" in this and other similar reference characters indicates any specified one of the operation registers F, X, Y, or J. The output of delay register 51 is also coupled to a program address register 58 in response to the control signal DRPR. The bit-parallel outputs of the registers 53 through 56 are selectively coupled to unmasked bus 40 in response to one of the gate control signals $\phi$RUB; and the output of register 58 also is coupled to bus 40 in response to signal PRUB.

The outputs of registers 53 through 56 may also be coupled to an argument bus 59 in response to one of the gate control signals $\phi$RAB in order to provide a second argument for the combinational logic of shift circuit 42 under the control of signal ABHQ or to provide a second argument for the combinational logic operations circuit 46. In the latter case, the signals are coupled from argument bus 59 through a one-bit rotate circuit 60 and a selection gate 61 that is controlled by the signal CCLG. Alternatively, the output of one-bit rotate circuit 60 may be coupled through a complementing circuit 62 to the gate 61. Details of the purposes and operations of the circuits 60, 61, and 62 are set forth in the aforementioned Kettley et al. application.

A 20-bit processor word can be selectively coupled through different paths for normal processor operations utilizing circuits 42, 43, and 46. One such path extends from memory access register 31 through unmasked bus 40, tandem operations circuit 41, masked bus 49, and delay register 51 to at least one of the general purpose operation registers 53 through 56. Conversely, the output of any one of those registers can be coupled through the unmasked bus 40, tandem operations circuit 41, masked bus 49, and an insertion masking circuit 63 to either the left or the right half of memory access register 31. Also the output of one of the operation registers 53 through 56, or the program address register 58, can be coupled by way of the unmasked bus 40, tandem operations circuit 41, masked bus 49, and delay register 51 back to the same register or to a different register. For example, the contents of program address register 58 would be so coupled through the tandem operation circuit 41 in order to increment the program address in the logic operations circuit 46 by means of a wired-in increment signaling arrangement in the one-bit rotate circuit 60 as described in the Kettley et al. application. If information is coupled from one of the operation registers back to the memory access register 31, it can then be read from register 31 by means of the circuits 26 to control drivers 23 for writing into memory 20 as previously described. The address at which such writing takes place is selected from bus 49 by a gate 64 or from register 58 by a gate 65, and the access circuits 21 address memory 20 during a control signal ADRSB. Gate 65 is normally enabled by a PRAD signal except when a transfer is to be executed, and then gate 64 is enabled.

Test decision logic circuits 66 are coupled to the shift circuit 42 for performing tests on information contained in any selected one of the general purpose registers 53 through 56 as described and claimed in the copending application of E. J. Pasternak, Ser. No. 498,787, filed Oct. 20, 1965. The tests determine the character of information in a register, and the test results are compared to a test condition specified in a program instruction which requires a conditional transfer operation. For example, such decision test logic can be employed for use in determining whether or not the content of a register is all ZEROS, or for determining whether or not a specified bit in a register is ZERO, or for determining the sign of data contained in a register. In accordance with the present invention the decision logic circuits 66 are employed in conjunction with processing operations for detecting the rightmost ONE of a processor word.

Match circuits 17' in FIG. 2 schematically represent the matching circuit 17 function of FIG. 1. Within processor 13 the twenty conductors of each of the buses 40 and 49 are applied through two sets of gates 72 and 69, respectively, to the match circuits 17'. The gates are actuated for such coupling, from the masked bus and unmasked bus to the match circuit registers, by an MBMR gate control signal once during each phase of each processor operating cycle. Other processor circuit points are advantageously matched less frequently or at irregular intervals, but the two aforementioned buses are regularly matched as noted because they are points that are most frequently utilized in routine processor operations as is known in the art and taught in the mentioned Kettley et al. application.

Buses 40 and 49 are matched in circuits 17' with corresponding bus circuit points in processor 16, and inputs to the matching circuits from such corresponding points are indicated schematically by a circuit 70 in FIG. 2. The output of match circuits 17' on a circuit 71 indicates to control circuit 36 the results of the matching operations in each phase. By matching the conditions of the two buses 40 and 49 in each phase it is possible to maintain continuous surveillance of the condition of execution of any particular instruction in the processors 13 and 16 and initiate any appropriate diagnostic or corrective action in a timely fashion, i.e., before new information from delay register 51 is overwritten into a general purpose register or the program address register.

In accordance with the present invention DRMϕ gates 76 are provided for operation in conjunction with the shift or rotate circuit 42 to detect the presence of a predetermined type of information signal bit in a 20-bit processor word which is received by the circuit 42 from the unmasked bus 40. The outputs from the gates 76 are utilized in a manner which will be described for controlling the operation of the shift circuit 42 in order to detect the occurrence of such an information bit, and those same gate output signals also comprise in binary coded form the bit position address of such a bit.

An example of a practical situation in which the gates 76 are advantageously employed is the one which was heretofore mentioned wherein successive scanner output words in an automatic electronic telephone office are compared by an EXCLUSIVE OR operation in the logic operations circuit 46, and the results of such comparison are stored in one of the general purpose operation registers 53 through 56. The contents of that one register are then coupled through the unmasked bus 40 to the shift circuit 42 wherein, by the cooperation of the gate 76, the presence and position of the rightmost ONE signal in such EXCLUSIVE OR output word that had been produced by circuit 46 are determined. Having determined such a bit position address the processor then utilizes such address information to control further processor operations for servicing a telephone system circuit which corresponds to such bit position address and for also converting the binary ONE signal in that address to a ZERO in order that any additional ONES may be detected. A typical instruction for detecting and zeroing the rightmost ONE in a processor word will be subsequently described in detail.

When the gates 76 are to be utilized as hereinbefore outlined, they are enabled by a signal from the gate control circuits 36 and at the same time the contents of any one of the general purpose registers 53 through 56 are coupled to the input connections of the shift circuit 42 through the unmasked bus 40. The output signals from the gates 76 are utilized to control the shift circuit 42 and they are also coupled through a gate 77 by an HQFR control signal to the rightmost, i.e., least significant, five bit positions in the F register 53. At the same time a gate control signal HQFRR is provided to reset the remaining fifteen bit positions of the F register to the ZERO condition so that they do not affect bit position address information that will be held in that register for possible subsequent processor utilization.

The five bits thus stored in the F register represent in binary notation the bit position address of the rightmost ONE in the processor word just received by the shift circuit 42. Subsequently, it is in some operations necessary to determine whether or not there are any additional binary ONE signals in the 20-bit processor word being tested. In order to accomplish this it is necessary to convert the rightmost ONE which has just been determined to a ZERO in order that the operation may be repeated to detect an additional ONE, if present, in the same processor word. In order to force a certain bit group to a certain condition a corresponding mask is produced and combined with the processor word in an appropriate operation in circuit 46. Thus, to force a previously detected ONE to the ZERO condition, a single-ZERO word mask is advantageously provided in response to the FRHQ gate control signal by a single-ZERO mask circuit 78. The mask circuit 78 is simply an array of gates which respond to the FRHQ control signal for biasing the input circuits of the shift circuit 42 to the binary ONE condition in all bit positions except the rightmost bit position thereof. The latter position remains in the ZERO condition because its input circuits are not enabled. The same FRHQ signal operates a gate 79 to couple the rightmost five bit signals from the F register 53 to the shift circuit 42 for controlling the operation thereof upon the aforementioned single-ZERO mask. The circuit from gate 79 to shift circuit 42 is shown in partial broken-line form to indicate that additional logic relating to other functions of the processor is advantageously included, as will be subsequently described; but such additional functions do not alter the basic functional operation of the invention as here presented.

When an instruction calls for a detected ONE to be forced to ZERO, the control circuit 36 directs a left rotation in shift circuit 42. The mask from circuit 78 is rotated left through a number of bit positions controlled by the signals from the F register so that the single ZERO of the mask appears in the bit position of the previously detected rightmost ONE signal. At the same time that the single-ZERO mask is being thus rotated, the contents of the same general purpose register which had previously been tested for a rightmost ONE are coupled through the argument bus 59, the one bit rotate circuit 60, the complement circuit 62, and selection gate 61 to the logic operations circuit 46. As noted in the aforementioned Kettley et al. application, signals coupled through both of the circuits 60 and 62 are doubly inverted; so they are not complemented. The signal WMLG is also present at this time so that the rotated single-ZERO mask provides one argument to the logic operations circuit 46, and the contents of the mentioned general purpose register provide the other argument.

The circuit 46 is controlled by the gate control 36 to operate in its logical AND mode so that the previously detected rightmost ONE in the contents of the general purpose register is converted to the binary ZERO condition. Other bit positions of the same processor word are not affected by the single-ZERO mask because the logical AND operation of the circuit 46 causes bit positions with two binary ONE inputs to produce a binary ONE output and positions with any binary ZERO input to produce a binary ZERO output. Accordingly, the previously detected rightmost ONE is combined with the single ZERO of the mask to produce a ZERO output; and other bit positions of the word are unchanged. The output of the logic operations circuit 46 is then returned to the general purpose register in accordance with the usual processor operation.

It should be noted, of course, that when the DRMφ gates 76 are being employed in the manner previously described, the decision test logic circuits 66 are also enabled for detecting the all-ZERO condition in the processor word which is being tested. If an output signal from logic circuits 66 to the gate control 36 indicates that the all-ZERO condition prevails, the further operations of detecting and zeroing the rightmost ONE are discontinued, and the processor transfers to a further instruction at the transfer address because it knows that the two scanner output words which had been compared were identical.

Figure 5:
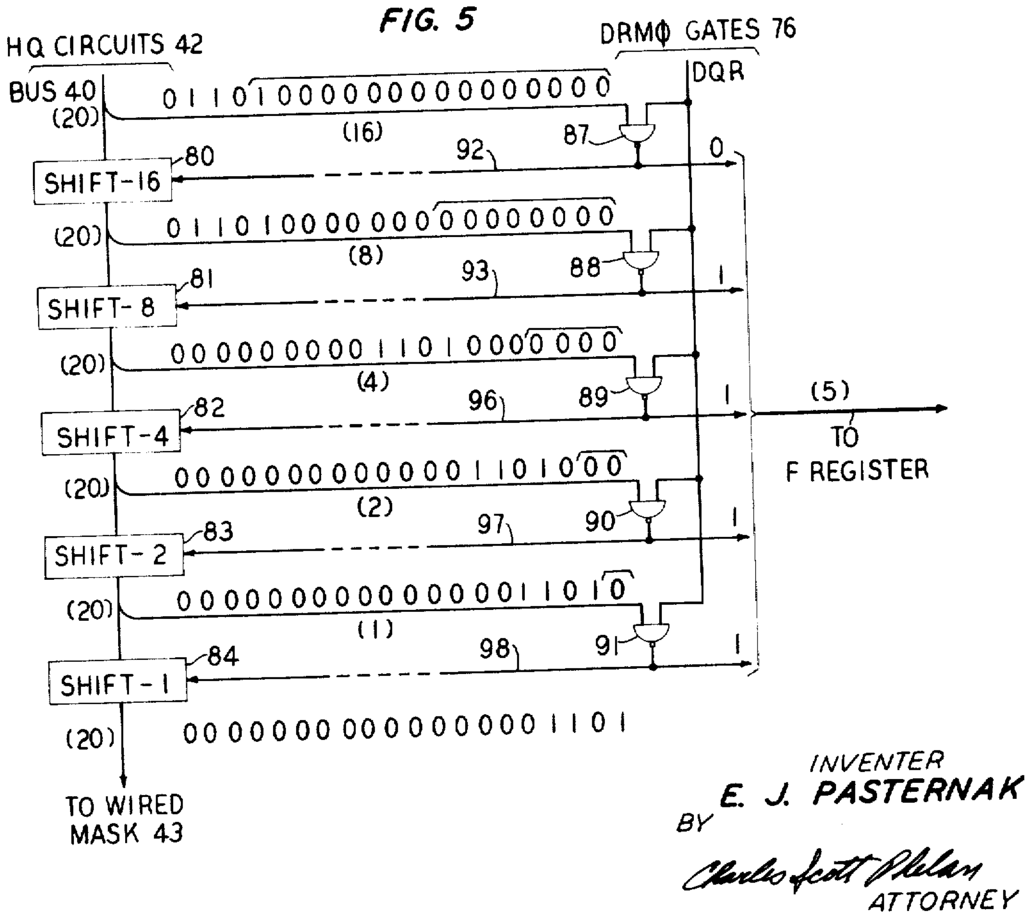
FIG. 5 is a simplified functional diagram illustrating the operation of the invention.

In FIG. 5 a simplified functional diagram is shown to depict the nature of cooperative action between DRMφ gates 76 and the shift circuits 42. The shift circuits include five shift stages 80, 81, 82, 83, and 84 of combinational logic. Each stage is adapted to accomplish a different amount of information shifting or rotation in accordance with control signals from gate control circuits 36, or from argument bus 59, or from the F register 53 or from the DRMφ gates as to be herein described. The illustrated shift stages perform shifting of 16, 8, 4, 2, and 1 bit positions, respectively, the same as in the aforementioned Muir application. However, the sequence of arrangement of the stages 80 through 84 between the unmasked bus 40 and the wired mask 43 is inverted from that shown in the Muir application. This reversal is accomplished for the convenience of operation of the DRMφ gates 76.

Twenty bit signals are applied in bit-parallel fashion to the input of the shift-16 stage from the bus 40; and that stage produces twenty output signals, also in bit-parallel fashion, which are applied to the inputs of the shift-8 stage 81. The twenty signals are similarly coupled through the remaining stages 82, 83, and 84. The DRMφ gates 76 are functionally represented in FIG. 5 by five gates 87, 88, 89, 90, and 91; and actual gate details are explained in connection with FIG. 6. Each of the gates 87 through 91 is enabled by a DQR signal from the gate control circuit 36 when the detect rightmost ONE operation is to be performed. Gate 87 is associated with the shift-16 stage and receives the sixteen rightmost bits of the 20-bit processor word which is also applied to the shift stage 80. In FIG. 5 an illustrative 20-bit word is shown at the input connections to the gate 87 with the bit signals received by that gate being bracketed in the drawing. The word includes binary ONE signals in the bit positions 15, 17 and 18, but for purposes of the present illustration only the binary ONE in bit position 15 is of interest.

The sixteen inputs signals to gate 87 from bus 40 are not in the same logic ZERO signal conditions, i.e., they are all ZERO except the ONE in position 15. Accordingly, the output from gate 87 on circuit 92 operates the shift-16 stage for a no-shift coupling condition and the 20-bit word is coupled through to the shift-8 stage with no rotation.

The rightmost eight bit signals in the input of shift-8 stage are also coupled to inputs of gate 88, and since they are all in the same ZERO signal condition the gate is operated to provide an output signal on a circuit 93 for operating the shift-8 stage 81. That stage shifts the 20-bit signal eight bit positions to the right, as shown adjacent to the input circuits of the gate 89. The latter gate is also enabled because the four rightmost bit position signals which it receives from the outputs of the shift-8 stage are all in the ZERO condition. Consequently, a signal on a circuit 96 from the gate 89 operates the shift-4 circuit 82 to shift the processor word an additional four bit positions to the right.

In the output of the shift-4 circuit the processor word has now been shifted to the right by twelve bit positions and the two rightmost bit signals thereof operate the gate 90 for applying a signal on a circuit 97 to actuate the shift-2 stage 83. Similar operation by the gate 91 in response to the single rightmost bit signal in the output of the stage 83 produces an operating signal on a circuit 98 for actuating the shift-1 stage 84 to shift the processor word an additional position to the right. It can now be seen that the 20-bit processor word has its rightmost binary ONE signal in the rightmost bit position in the output of the shift-1 stage of the shift circuits 42.

It is thus seen with respect to FIG. 5 that each of the DRMφ gates 87 through 91 is associated with a different stage of the shift circuits 42 and controls the shifting operation of its corresponding stage. The control is exercised in accordance with the character of the information signals in a predetermined number of the rightmost bit positions of the processor word which is received by the shift circuits 42. The predetermined number for each of the DRMφ gates is equal in number to the bit position shifting capability of the shift stage which it controls.

Now looking at the output signals of the gates 87 through 91 as a single five-bit binary coded word with the output of gate 91 being in the least significant binary position, it can be seen that those output signals represent the binary coding for the number 15. That is also the bit position address of the rightmost ONE in the original processor word received from bus 40, assuming that the rightmost bit position is designated position zero. This further assumes that the output signals have a binary ONE significance when they are of a character which is adapted to operate the corresponding shift stage of the circuits 42. The five outputs from the five gates 87 through 91 are also coupled to the F register as previously described in connection with FIG. 2.

Figure 6:
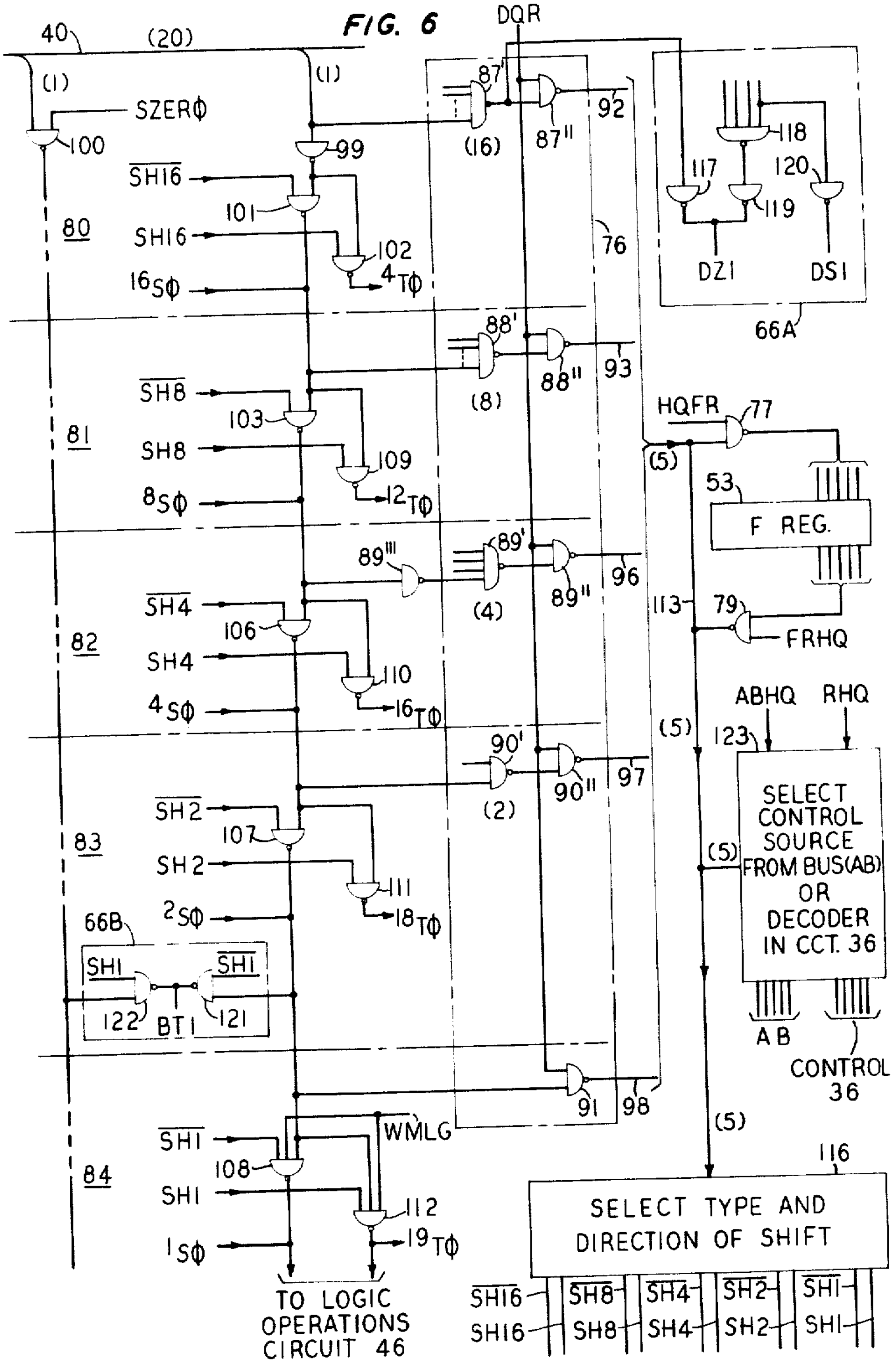
FIG. 6 is a diagram in somewhat greater detail of the bit-moving and character-responsive circuit combination of the invention.

Full details of the DRMφ gates 76 in relation to the shift circuits 42 are shown in FIG. 6. In this figure the unmasked bus 40 is illustrated at the top of the figure and single conductors are dropped off from the bus to supply each of the bit position input circuits of the shift circuits 42. Only two of such input circuits are illustrated in FIG. 6, and these are the inputs for the bit positions zero and one. An inverting gate 99 receives the input signal from bus 40 for the bit position zero and a gate 100 receives the input signal for the bit position 1. The latter gate also receives the SZERφ signal from the single-ZERO mask circuit 78 for controlling the gate 100 by setting its input to ground potential, representing the binary ONE condition at the input to shift circuit 42, when such mask is employed. No SZERφ signal is applied to gate 99, so when a mask is being applied that gate receives the normal no-signal high voltage condition from bus 40, which condition represents the binary ZERO state at the input to shift circuit 42. The other eighteen bit positions, two through nineteen which are not shown in FIG. 6, have input circuits of the same type as that represented by the gate 100, and the remainder of the circuits in each bit position of the circuits 42 are similar to those which will be hereinafter described for position zero.

In the shift-16 stage 80 two gates 101 and 102 are operated under the control of shift control signals developed by logic circuits, to be subsequently described, for coupling the output of gate 99 through to the shift-8 stage 81 without any bit position shift, or for coupling the same output to the input of the shift-8 stage 81 with a shift of sixteen bit positions to the right. The shift circuits 42 can be operated in either a shift or a rotate mode. For this purpose, all shifting is advantageously arranged on a right shift basis in a 20's complement fashion. For example, if a left shift or rotation of five bit positions is required, the shift circuit 42 is arranged to perform a right shift or rotation of fifteen bit positions to meet the requirement. Accordingly, a 16-bit right rotation performed by the shift-16 circuit 80 requires that the output of shift gate 102 be coupled to the bit position four. This is indicated by the output lead designation $4_{T\phi}$. This designation indicates that such output lead of gate 102 is connected to the output of the through gate, i.e., corresponding to gate 101, in bit position four. In a similar manner, a lead designated $16_{S\phi}$ is connected to the output of the illustrated through gate 101 for the bit position zero to indicate that the same output is coupled in multiple with the output of the shift gate in bit position sixteen as is further required for a 16-bit right shift in the bit position zero.

Through gates 103, 106, 107, and 108 are connected in their respective shift stages in a manner which is similar to the connection of the through gate 101 in the shift-16 stage 80. That is, each through gate receives an input signal from the output of the through gate in the same bit position and in the preceding shift stage. Each through gate provides a similar output to a succeeding stage, if any, and has its output coupled to receive the output of the shift gate in the bit position corresponding to the amount of right shift for the same stage. Shift gates 109, 110, 111, and 112 are connected in a manner similar to the connection of the shift gate 102 so that they also receive an input from the output of the through gate in the same bit position of a preceding shift stage, if any. Each shift gate also provides its output for multiple connection to the output of the through gate in the bit position of the same stage which is represented by a right bit position shift corresponding to the shift capability of the stage. The WMLG signal is advantageously provided to input connections of the gates 108 and 112 in the shift-1 stage 84 for controlling the wired mask function.

The DRMφ gates 76 include a gate 87′ in shift stage 80 which receives sixteen input signals as indicated in connnection with FIG. 5 from the rightmost sixteen bit positions of the processor word. A single output from the gate 87′ provides a signal which indicates whether or not an input coincidence condition of all sixteen bits at logic ZERO (high potential) prevailed, and that output is applied to a gate 87″. The later gate is also enabled by the DQR signal to couple the output from gate 87′ to circuits for controlling the shift stages as previously outlined in connection with FIG. 5. In shift stage 81 two gates 88′ and 88″ are provided for operating the same as the gates 87′ and 87″ with respect to the rightmost eight bit position signals at the input to shift stage 81. Gates 90′ and 90″ also perform in a similar manner for the stage 83.

In the stage 82 the similar operation of gates 89′ and 89″ is supplemented by an additional gate 89‴ interposed between the input to gate 106 from stage 81 and the gate 89′ to provide an additional stage of signal inversion. Similar gates 89‴ (not shown) are provided between the other three inputs to gate 89′ from other bit positions. The gates 89‴ are needed so that the inputs to gate 89′ have a consistent polarity for corresponding conditions in relation to the inputs of the corresponding DRMφ gates of other stages. The gates 89‴ are necessitated by the odd number of signal inversions accomplished by the gates 99, 101, and 103 before signals reach the shift stage 82. No additional gating is required in the shift stage 84 to supplement the operation of the gate 91 because it is required to work with only a single input from the shift circuits 42 and because that input also has had an odd number of inversions in the gates 99, 101, 103, 106, and 107.

The outputs of the five DRMφ gates 87″ through 91 are coupled through cable 113 to a set of selection gates 116 which are responsive to signals from the gate control 36 for selecting the necessary direction of shift and for selecting either the shift or the rotate function as required in accordance with the nature of the instruction being executed. Gates of this type which also convert left shift signals to equivalent 20's complement right shift signals are shown in the aforementioned Muir application. Double-rail logic output circuits for controlling the five stages of the shift circuits 42 are provided from the selection circuits 116. These signals include the SH16 and the $\overline{\text{SH16}}$ for controlling the shift-16 stage 80 and similar double-rail logic for the shift stages 81 through 84. Connections to such stages are indicated by similar reference characters in lieu of unnecessarily complicating the drawing with a larger number of such control leads. Thus, the DRMφ gates 76 receive information signals from the inputs to the various shift stages and utilize those signals for controlling, through gate circuits 116, the operation of such shift stages in accordance with the character of the information signal type in an unknown bit position of a received processor word.

The test decision logic 66 is shown in two portions 66A and 66B in FIG. 6. In the circuit 66A the output of gate 87′ is further coupled through an inverting gate 117 to a DZ1 output circuit. A gate 118 is provided and receives four input signals from the bit positions 16 through 19, to which gate 87′ is not responsive, at the input to shift stage 80. Coincidence of input signal conditions for the gate 118 actuates that gate in the same fashion as the gate 87′, and its output is coupled through an inverting gate 119 to circuit DZ1. The latter circuit provides a signal to the gate control circuits 36 to indicate whether or not an all-ZERO condition prevails in a received processor word. A gate 120 receives signals from the bit position 19, which is the sign bit, to provide the DS1 output to gate control circuits 36 for indicating the sign of a data word.

In the decision logic circuits 66B two gates 121 and 122 receive input signals from the outputs of the through gate 107 in bit position zero and its corresponding gate in position one of the shift-2 stage 83. The gates 121 and 122 also receive the $\overline{\text{SH1}}$ and the SH1 signals, respectively, to provide the bit test BT1 signal to gate control circuits 36 for indicating the binary ONE or ZERO condition of a particular bit of a processor word. Thus, if a transfer instruction requires a transfer on the condition of a particular bit of a processor word, that bit is shifted automatically to the correct bit position for accomplishing a bit test in substantially the manner described in the aforementioned Pasternak application. In the particular embodiment illustrated in FIG. 6, a bit in an even numbered bit position is shifted to bit position zero for bit testing, and it is then coupled from the output of the gate 107 in that position to the gate 121. Since an even numbered bit position was addressed for the indicated bit test, the $\overline{\text{SH1}}$ signal is present and enables the gate 121 to couple the bit condition indicating signal to the lead BT1. Similarly, if an odd numbered bit position is addressed for a bit test, the bit is shifted to bit position one and the SH1 signal causes gate 122 to couple the bit condition signal to the BT1 lead.

When the outputs of the DRMφ gates are coupled by the cable 113 to the selection circuit 116 they are also simultaneously coupled through the gate 77 by the HQFR signal and to the F register 53 as previously described. Subsequently, if the previously detected rightmost ONE is to be zeroed, the outputs of the rightmost five bit positions of register 53 are coupled through gate 79 to the selection circuits 116 for providing shift control signals to the shift or rotate circuit 42. Additional selection circuits 123 receive an ABHQ control signal from the gate control circuit 36 for selection shift control signals AB from the argument bus. The selection circuits 123 may alternatively receive an RHQ signal from the gate control circuit 36 to provide the shift control signals from the decoders in the gate control circuit 36. The selection circuits 123 are simply separate sets of five gates, each set being responsive to a different one of the ABHQ or RHQ signals for coupling control signals from a selected source to the selection circuits 116. It is to be understood, of course, that if any one of the signals FRHQ, DQR, ABHQ, or RHQ is provided, the others are absent.

Figure 7:
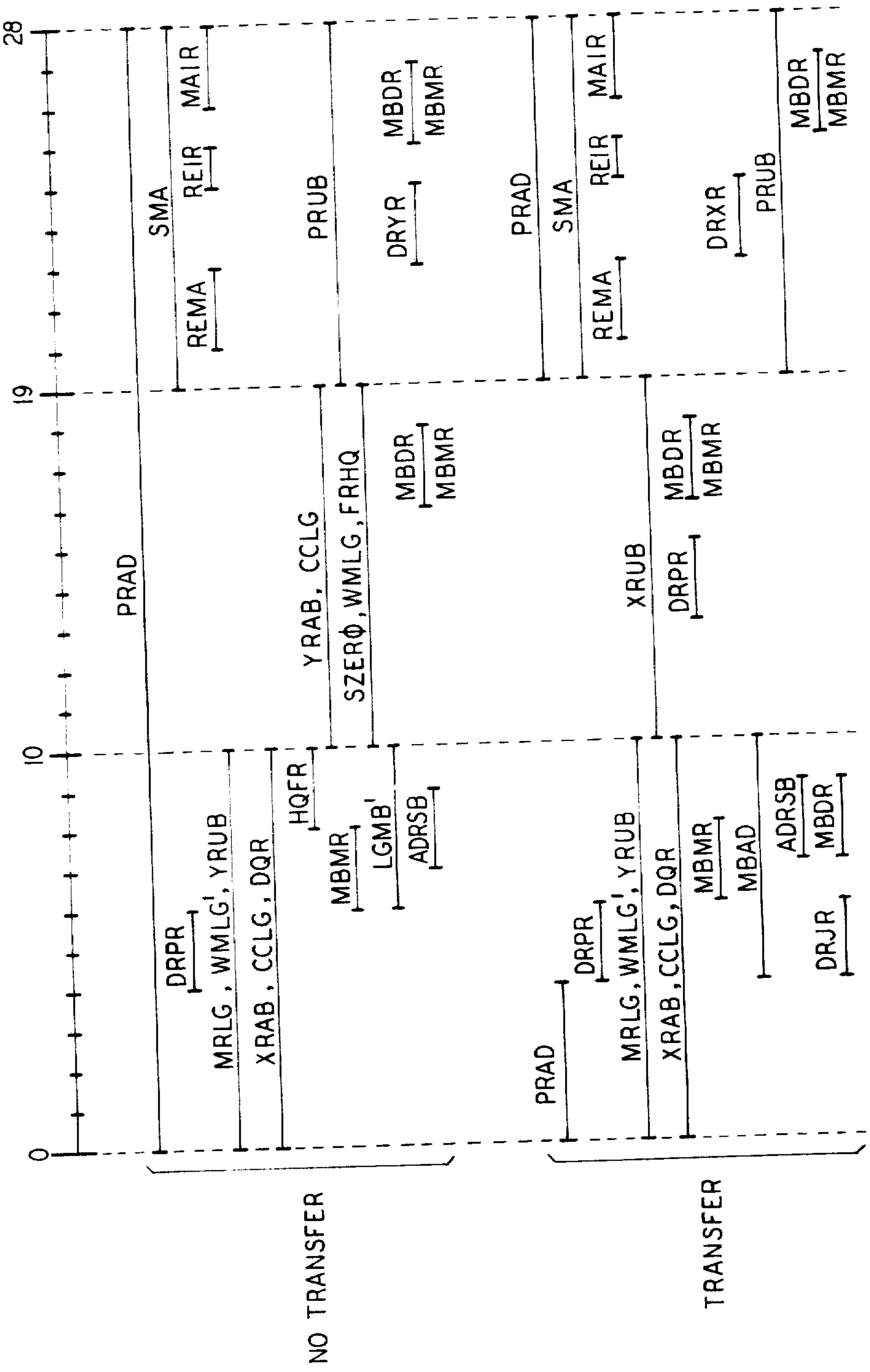
FIG. 7 is a timing diagram illustrating the operation of the invention.

FIG. 7 shows timing diagrams depicting the operation of the processor of FIG. 2, insofar as the present invention is concerned, for a typical instruction utilizing the invention. Such an instruction is:

DZRMϕY TADDR,XA,J

There are other known processor operations in which the features of the invention are advantageously utilized. However, the preceding illustrative instruction is typical of those which utilize a number of the principal features of the invention. The purpose of the illustrative instruction is to detect and zero the rightmost ONE in the contents of the Y register, but, if no ONE is found, to transfer to the indicated transfer address. In this case the transfer address is TADDR, and the instruction requires that during execution of the instruction the transfer address be indexed with the contents of the X register. The X register contents should be incremented, as indicated by the A following the X, in the event that a transfer does take place. Furthermore, if a transfer is accomplished, the previously incremented program address is stored in the J register to be available as a return address following completion of the subroutine to which the processor is transferring. A transfer is carried out when the contents of the Y register are found to include no ONES, and this condition is detected by the decision logic as hereinbefore described.

In FIG. 7 a time scale across the top of the figure is divided into twenty-eight equal time intervals by twenty-nine time tick marks numbered from 0 to 28. The total interval represents one cycle of sequencer operation and is divided into three phases of processor operation. The twenty-eight time intervals are advantageously intervals of approximately one-quarter of a microsecond. The upper portion of the diagram in FIG. 7 depicts the principal operations in connection with the aforementioned illustrative instruction for the situation in which no transfer is required, and the lower portion of the diagram depicts operation for a transfer.

When no transfer is required, the PRAD timing signal is present throughout the entire cycle of operation and maintains the output of the program address register 58 available to the memory access circuits 21. During the first phase in the time interval 0T10, i.e., the interval between times 0 and 10, the MRLG time signal is present to couple a 20-bit processor word representing the transfer address from the right half of the memory access register 31 to the logic operations circuit 46. At the same time the WMLG′ signal inhibits coupling from wired mask 43 to the logic operations circuit 46. Also during the entire first phase the XRAB signal couples the contents of the X register to the argument bus, and the CCLG signal causes the X register contents to be appropriately coupled to the logic operations circuit 46 for indexing the transfer address. In accordance with the instruction, the YRUB timing signal causes the contents of the Y register to be coupled to the unmasked bus throughout the first phase, and at the same time the DQR signal enables the DRMϕ gates 76 for detecting the rightmost ONE in the manner hereinbefore described.

Since no transfer is required, the DRPR signal appears during the time interval 4T6 for coupling to the program address register a program address which had been incremented during a preceding cycle of processor operation and which thereafter rested in the delay register. During time 6T10 the LGMB′ signal, which represents the absence of an enabling signal for the gate 48, disables that gate thereby removing the indexed transfer address from bus 49. During time 6T8, an MBMR signal samples various signal conditions to activate the matching circuits as previously outlined. At the latter time the contents of the Y register on the unmasked bus and the presence of all ZEROES on the masked bus are coupled to the matching circuits to be compared with the corresponding signals from the other processor. During time 7T9, the ADRSB signal enables the memory access circuits to couple the program address from the gate 65 for addressing the memory 20. During time 8T10 the HQFR signal couples the outputs of the DRMϕ gates 76 to the F register where they are retained for further use.

During the second phase of the cycle, the contents of the Y register are coupled from the argument bus and the selection circuit 61 to the logic operations circuit 46 as one argument for the logical AND operation required for zeroing a previously detected rightmost ONE signal. At the same time 10T19 the SZERϕ signal applies the single-ZERO mask; and the WMLG signal permits such mask, after appropriate rotation as hereinbefore described, to be coupled as the second argument for the logic operations circuit 46. The FRHQ signal couples the bit position address from the F register to control the shift circuit 42 to produce the correct amount of rotation for placing the single ZERO of the mask in the proper position. At 16T18 the signals then on the masked bus, and representing the revised contents of the Y register, are coupled to the delay register. At the same time the MBMR signal reappears to activate the matching circuits once again. At this time the revised contents of the Y register, which are represented by signals on the masked bus, are matched.

The third phase of operation under the illustrative instruction for the no transfer condition causes the processor to receive a new instruction. The SMA signal is present during the entire third phase interval 19T28 and makes the read-out from memory 20 available during the entire interval. Naturally memory 20 includes an appropriate read-out buffer register and time sequence gating (not shown) as known in the art, which makes the read-out available to the processor during the 19T28 interval but after the memory access register has been reset. A PRUB signal is also present during the entire third phase for coupling the contents of the program register to the unmasked bus for incrementing those contents in order to make the next sequential program instruction available to the processor. The REMA signal at 20T22 resets the memory access register so that the memory read-out information may be correctly stored therein. At 22T24 a DRYR signal couples the revised contents of the Y register from the delay register into the Y register so that the previous information content therein, with the previously detected rightmost ONE, is thereby displaced. At 24T25 the REIR signal resets the instruction register 32, and subsequently at 26T28 the MAIR signal couples instruction information to the instruction register from the memory access register.

At 25T27 the incremented program address is coupled from the masked bus to the delay register, and at the same time the matching circuits are activated. During matching in this phase the incremented program address on the masked bus is checked; and the old program address before incrementing, which is on the unmasked bus, is also checked. Typically the new instruction relates to providing service to a circuit corresponding to the detected rightmost ONE bit position address in the illustrative telephone system application of the invention. Upon completion of the servicing the program would loop back to the DZRMϕY instruction to check for an additional ONE. The looping continues until the Y register is left with nothing but ZEROS.

In summary then, during the DZRMϕ instruction for the no transfer condition, contents of any one of the general purpose registers 54 through 56 are checked for the all-ZERO condition and for the presence of the rightmost ONE signal therein at the same time. Simultaneously therewith the transfer address is indexed. The register contents which are being checked for certain information signal conditions are also present on buses utilized for general purpose processing, and they are therefore checked by the routine matching operations which occur in each phase of processor operation. Furthermore, after a rightmost ONE in a processor word has been converted to the ZERO condition, the revised word also appears on a general purpose processing bus so that it is checked during the routine matching operations.

If it is assumed now that a transfer is to occur, operations depicted in the lower portion of FIG. 7 take place. The PRAD signal persists only during the time 0T4, and then the detection of an all-ZERO condition in the manner previously described causes the gate control circuits 36 to produce the MBAD signal in the time 4T10 for coupling to the memory access circuits 21 the indexed transfer address which was generated in the same manner previously described for the no transfer condition. The incremented program address is, for circuit convenience, coupled from the delay register to the program register during time 4T6, the same as before; and at the same time that address is also coupled to the J register for storage as the program return address. At time 6T8 the MBMR signal appears as before for matching the contents of the Y register on the unmasked bus; and, in addition in this case, the indexed transfer address which is now present on the masked bus. Thus, this time the indexed transfer address is matched along with the processor word which is being tested for the all-ZERO and for the rightmost ONE conditions.

During the second phase of the transfer operation the index from the X register is coupled to the unmasked bus to be incremented as previously outlined during the time interval 10T19. During time 13T16 the indexed transfer address which had been placed in the delay register during the first phase is now transferred from the delay register to the program address register. During time 16T18 the incremented index is coupled from the masked bus to the delay register; and the matching circuits are activated for checking the incremented index on the masked bus, and the unincremented index on the unmasked bus.

During the third phase of the transfer operation the functions are similar to those for the no transfer operation. The exception of interest is that this time the contents of the delay register are coupled to the X register instead of to the Y register during the time interval 22T24, since this time it is the incremented index and not the processor word with the zeroed rightmost ONE that must be saved.

It can be seen then that the DRM$\phi$ gates 76 make it possible to utilize routine matching functions for improved maintenance during operations requiring the detection and zeroing of certain information signal bits in a processor word included in any of the general purpose registers. In this connection it is to be understood, of course, that although the J register is, under certain conditions, utilized for storing a return address, it need not be so utilized. That register can instead be available for storing a processor word for testing since the storage of a return address is simply an option which can be specified in the instruction. Similarly, other general purpose registers can be used for storing the return address at the programmer's option. The DMR$\phi$ gates also cooperate which circuits of the shift or rotate circuit 42 to provide increased utilization of the circuits 42 and at the same time eliminate the need for stepwise shifting circuits or for complex logical code translating arrays which were heretofore required in the prior art in connection with processor functions in which it was necessary to detect the signal condition in an unknown bit position of a processor word, and to alter the signal condition in that bit position.

Although the present invention has been described in connection with a particular embodiment thereof, it is to be understood that this is by way of illustration and that additional modifications and embodiments which will be apparent to those skilled in the art are included within the spirit and scope of the invention.

What is claimed is:

1. In combination,
a shift circuit having multiple stages through which signals are transmitted in sequence for shifting the bit positions of information signal bits in a group of such bits,
means controlling said stages, respectively, for shifting or not shifting signals transmitted therethrough,
means supplying information signal bit groups to said shift circuit, and
means coupled to said stages and responsive to signals at respective ones of said stages for actuating said controlling means to control the extent of bit position shifting in said shift circuit.

2. In combination,
a shift circuit for shifting the bit positions of information signal bits in a group of such bits,
means supplying information signal bit groups to said shift circuit,
means coupled to predetermined outputs of said shift circuit controlling the extent of bit position shifting in said shift circuit,
means coupled to said controlling means for storing an indication of the extent of bit position shift accomplished on each of said bit groups, and
means responsive to said indication altering the signal character of at least one of said bits.

3. In combination,
a shift circuit for shifting the bit positions of information signal bits in a group of such bits,
means supplying information signal bit groups to said shift circuit,
means coupled to predetermined outputs of said shift circuit controlling the extent of bit position shifting in said shift circuit,
means coupled to said controlling means for storing an indication of the extent of the bit position shift accomplished on each of said bit groups,
means applying a predetermined signal bit group to said shift circuit, and
means controlling the operation of said shift circuit in accordance with said indication.

4. The combination in accordance with claim 3 which comprises in addition
means responsive to first and second argument signals for changing the signal condition of one of said argument signals,
means coupling one of said information signal bit groups as a first argument to said changing means,
means applying a mask signal bit group of predetermined configuration to said shift circuit,
means controlling said shift circuit in accordance with the contents of said storing means,
means applying the output of said shift circuit as a second argument to said changing means, and
means storing the output of said changing means.

5. In combination,
a shift circuit for shifting the bit positions of information signal bits in a group of such bits,
means supplying information signal bit groups to said shift circuit,
means coupled to predetermined outputs of said shift circuit controlling the extent of bit position shifting in said shift circuit,
said shift circuit is a combinational logic type of circuit for transversely moving the positions of the bits of each of said groups, each of said groups is received in bit-parallel fashion from said supplying means, said shift circuit including a plurality of tandem connected shifting stages each of which is controllable to perform a shift through a different number of bit positions, means coupled to each of said stages detecting the coincidence of a predetermined condition of signals in the right-most portion of the bit-parallel inputs to that stage, said right-most inputs being equal in number to the number of bit positions of controllable shift of such stage, and means coupling the output of each of said detecting means to control its corresponding shift stage to cause a shift of the bit-parallel information in response to said predetermined signal coincidence condition for such stage.

6. The combination in accordance with claim 5 which comprises in addition first and second registers for storing information signals, means coupling the output of said detecting means to said first register, means disabling said detecting means, means biasing all but one input bit position of said shift circuit to the first of said tandem stages to a first predetermined signal condition thereby forming a single-bit mask, means coupling the contents of said first register to control said shift circuit for rotating said mask so that the signal in said one position thereof is shifted to the bit position represented by the contents of said first register, and means combining the output of the last tandem stage of said shift circuit with the contents of said second register for changing the signal condition of the signal in the corresponding bit position thereof.

7. In combination, a shift circuit for shifting the bit positions of information signal bits in a group of such bits, means supplying information signal bit groups to said shift circuit, means coupled to predetermined outputs of said shift circuit controlling the extent of bit position shifting in said shift circuit, said shift circuit, said supplying means, and said controlling means comprise a part of a data processor, said processor further comprises a plurality of registers, said supplying means include means coupling signals representing the contents of a selectable one of said registers to said shift circuit, and said controlling means are responsive to the character of signals from said coupling means.

8. The combination in accordance with claim 7 in which an additional data processor similar to the first-mentioned processor is provided, means couple said processors for operation together, each of said processors includes matching circuits having two sets of input connections thereon coupled to predetermined corresponding circuit points of said processors, respectively, said matching circuits generating a processor control signal each time a mismatch is detected, at least one set of said circuit points includes said coupling means in each of said processors, and means activating said matching circuits at a predetermined time in each phase of operation of said processors.

9. The combination in accordance with claim 7 in which said coupling means couples said signals in signal bit-parallel fashion, said shaft circuit is a combinational logic type of circuit for transversely moving the positions of the bits of said signals, said shift circuit including a plurality of tandem connected shift stages each of which is controllable to perform a shift through a different number of bit positions, means are coupled to each of said stages for detecting the coincidence of a predetermined condition of signals in the rightmost portion of bit-parallel inputs to that stage, said rightmost inputs being equal in number to the number of bit positions of shift which are produced by such stage, and means coupling the output of each of said detecting means to control its corresponding shift stage to cause a shift of the bit-parallel information in response to said predetermined signal coincidence condition.

10. The combination in accordance with claim 7 which further comprises said coupling means coupling said signals in signal bit-parallel array, means coupling the output of said controlling means to a first one of said registers, such output indicating the number of bit positions of shift accomplished by said shifting circuit, means disabling said controlling means, means biasing all but one input bit position of said shift circuit to a first predetermined signal condition thereby forming a single-bit mask, means coupling the contents of said first register to control said shift circuit for rotating said mask so that the signal in said one input bit position thereof is shifted to a position represented by the contents of said first register, and means combining the output of said shift circuit with the contents of a second one of said registers for changing the signal condition of the signal in the last-mentioned bit position thereof.

11. The combination in accordance with claim 7 which comprises in addition memory means storing a program of instructions for controlling said processor, said instructions including a transfer instruction having coding defining a transfer operation, an address in said memory means for a further one of said instructions, and a predetermined transfer criterion which is a function of the information signal content of said one register, and means indexing said transfer address simultaneously with the operation of said shift circuit.

12. The combination in accordance with claim 11 in which said coupling means couples said signals in bit-parallel array, said shift circuit comprises a plurality of tandem connected combinational logic shifting stages, each of said stages being adapted to shift signals through a different number of bit positions of said array, said stages being arranged in decreasing order of shift magnitude capabilities with the most significant shifting stage being coupled to receive signals applied to the shift circuit input, means responsive to said transfer criterion controlling said stages for shifting a predetermined bit signal to one of the two least significant bit positions of said shift circuit, means coupled to the two least significant bit positions in the input of the least significant one of said shift stages for testing the signal condition therein, and means responsive to said criterion coding selectively operating said testing means of said least significant bit position for shifts through an even number of bit positions and operating said testing means of the next to least significant bit position for shifts of an odd number of bit positions.

13. In combination, a shift circuit, means applying a group of binary coded signal bits to said shift circuit in bit-parallel array, means coupled to said shift circuit for deriving signals indicating the bit-position address of the rightmost binary ONE signal in said group, and means applying said derived signals to control said shift circuit for shifting said rightmost ONE to a predetermined bit position in said group.

References Cited

UNITED STATES PATENTS

| | | | |
|---|---|---|---|
| 3,076,181 | 1/1963 | Newhouse et al. | 340—174 |
| 3,291,910 | 12/1966 | Nicklas et al. | 178—26 |

OTHER REFERENCES

IBM Technical Disclosure Bulletin, vol. 2, No. 5, February 1960, p. 72.

ROBERT C. BAILEY, *Primary Examiner.*

R. B. ZACHE, *Assistant Examiner.*